United States Patent [19]

Maus et al.

[11] Patent Number: 5,255,511

[45] Date of Patent: Oct. 26, 1993

[54] METHOD AND APPARATUS FOR OPERATIONAL MONITORING OF A CATALYTIC CONVERTER OF AN INTERNAL COMBUSTION ENGINE AND A CATALYTIC CONVERTER TO BE MONITORED

[75] Inventors: Wolfgang Maus; Helmut Swars, both of Bergisch Gladbach; Rolf Brück, Overath, all of Fed. Rep. of Germany

[73] Assignee: Emitec Gesellschaft fuer Emissionstechnologie, Lohmar, Fed. Rep. of Germany

[21] Appl. No.: 947,722

[22] Filed: Sep. 18, 1992

[30] Foreign Application Priority Data

Mar. 19, 1990 [DE] Fed. Rep. of Germany ....... 4008779

[51] Int. Cl.$^5$ ............................................... F01N 3/28
[52] U.S. Cl. ..................................... 60/274; 60/284; 60/286; 60/300; 374/144; 422/174; 422/180; 423/212; 502/527
[58] Field of Search ................. 60/274, 277, 286, 300, 60/285, 284; 374/144; 422/174, 180; 423/212; 502/527

[56] References Cited

U.S. PATENT DOCUMENTS

| | | | |
|---|---|---|---|
| 3,785,151 | 1/1974 | Holl | 60/277 |
| 3,838,569 | 10/1974 | Reck | 60/277 |
| 3,906,721 | 9/1975 | Micheli et al. | |
| 3,988,890 | 11/1976 | Abthoff | 60/277 |
| 4,319,451 | 3/1982 | Tajima | 60/285 |
| 4,729,220 | 3/1988 | Terasaka | 60/277 |
| 5,060,473 | 10/1991 | Nakagawa | 60/277 |
| 5,146,743 | 9/1992 | Maus | 60/284 |

FOREIGN PATENT DOCUMENTS

| | | |
|---|---|---|
| 0223058 | 5/1987 | European Pat. Off. . |
| 0245737 | 11/1987 | European Pat. Off. . |
| 0245738 | 11/1987 | European Pat. Off. . |
| 0260031 | 3/1988 | European Pat. Off. . |
| 2304622 | 8/1974 | Fed. Rep. of Germany . |
| 2346425 | 6/1977 | Fed. Rep. of Germany . |
| 2643739 | 3/1986 | Fed. Rep. of Germany . |
| 3524592 | 9/1986 | Fed. Rep. of Germany . |
| 3516981 | 11/1986 | Fed. Rep. of Germany . |
| 3540013 | 1/1987 | Fed. Rep. of Germany . |
| 3543011 | 9/1988 | Fed. Rep. of Germany . |
| 269673 | 7/1989 | German Democratic Rep. . |
| 8807622 | 10/1988 | Int'l Pat. Institute . |
| 8910470 | 11/1989 | Int'l Pat. Institute . |
| 8910471 | 11/1989 | Int'l Pat. Institute . |
| 56064139 | 10/1979 | Japan . |
| 62-223427 | 3/1986 | Japan . |
| 01139906 | 11/1987 | Japan . |
| 01232106 | 3/1988 | Japan . |

Primary Examiner—Douglas Hart
Attorney, Agent, or Firm—Herbert L. Lerner; Laurence A. Greenberg

[57] ABSTRACT

A method for operational monitoring of a catalytic converter of an exhaust system of an engine includes selecting at least two measurement locations at three-dimensionally spaced-apart cross-sectional regions of the exhaust system, and defining at least a partial volume of the catalytic converter between the locations being definitive for catalytic conversion of pollutants in the exhaust gas. The temperature at the regions is measured and monitored and the temperature at least at one of the locations is measured integrally over an approximately representative portion of at least one region and not spotwise. An apparatus for operational monitoring includes at least two temperature sensors disposed successively in flow direction in at least two regions of the exhaust system, defining at least the partial volume of the catalytic converter. At least one of the sensors integrally measures temperature over an approximately representative portion of the region in which it is disposed. An electronic monitoring apparatus evaluates measured temperature values. A display apparatus displays an evaluation outcome. A catalytic converter includes at least partially structured sheet-metal layers. At least one sensor is integrated into one of the structured sheet-metal layers in at least one cross-sectional region near at least one end surface, for integrally measuring temperature over an approximately representative portion of the one region.

39 Claims, 3 Drawing Sheets

METHOD AND APPARATUS FOR OPERATIONAL MONITORING OF A CATALYTIC CONVERTER OF AN INTERNAL COMBUSTION ENGINE AND A CATALYTIC CONVERTER TO BE MONITORED

CROSS-REFERENCE TO RELATED APPLICATION

This application is a continuation of International Application Serial No. PCT/EP91/00518, filed Mar. 18, 1991.

The present invention relates to a method for operational monitoring of a catalytic converter for exhaust gases of an internal combustion engine having an exhaust system, an apparatus suitable for this purpose, and a catalytic converter especially constructed for this purpose.

In order to meet the increasingly stringent environmental protection regulations in many countries, many internal combustion engines, especially in motor vehicles, have by now been equipped with a catalytic converter. Such a catalytic converter has exhaust gas flowing through it, and in its catalytically active volume, which has a larger surface area that comes into contact with the exhaust gas, it catalytically converts pollutants in the exhaust gas into harmless substances. Many varied versions of carrier bodies for carrying catalytically active material are known, some of which are ceramic and some of which are metal. Generally, they are honeycomb-like bodies, which have a number of channels through which exhaust gas flows. Metal catalytic converters are generally made up of layered, spirally wound or otherwise looped or intertwined structured metal sheets. Such forms are described in Published European Application No. 0 223 058, corresponding to U.S. Pat. No. 4,824,011; Published European Application No. 0 245 737 corresponding to U.S. Pat. Nos. 4,832,998 and 4,923,109; or Published European Application No. 0 245 738 corresponding to U.S. Pat. Nos. 4,803,189 and 4,946,822.

In order to further reduce pollutants, electrically heatable catalytic converters which more quickly reach the requisite temperature for catalytic conversion have also already been proposed, in order to assure catalytic conversion immediately after the engine is started. Such heatable catalytic converters are described, for instance, in Published International Application WO 89/10470.

Heatable catalytic converter bodies are also described in Published International Application WO 89/10471, which can simultaneously act as temperature sensors, through the measurement of their resistance. When used as temperature sensors, they measure the temperature integrally over the entire heatable region, and in particular integrally over a total cross-sectional region. Due to the overall low resistance of such a heatable honeycomb body, the accuracy of measurement is not especially high, particularly for transient events. Monitoring a catalytic converter solely with such a resistance measurement over the entire body is only limitedly informative.

As an additional expansion of the known systems, it has been recognized as desirable to be capable of monitoring the functional capacity of a catalytic exhaust gas cleaning operation continuously during operation, in order to detect malfunctions early and to be able to eliminate them. That has been attempted with the aid of two temperature measuring locations, such as where the temperature difference was observed. Such configurations are described in Published International Application WO 88/07622, German Published, Non-Prosecuted Application DE 35 16 981 A1, German Published, Prosecuted Application DE 23 46 425, corresponding to U.S. Pat. No. 3,882,451 or German Patent DE 26 43 739 C2.

It is accordingly an object of the invention to provide a method and an apparatus for operational monitoring of a catalytic converter of an internal combustion engine and a catalytic converter to be monitored, which overcome the hereinafore-mentioned disadvantages of the heretofore-known methods, devices and products of this general type and to equip such a measuring system for the most accurate, comprehensive possible monitoring of the function of the catalytic converter during operation, with as little expenditure for instrumentation as possible, and with low vulnerability to malfunction.

With the foregoing and other objects in view there is provided, in accordance with the invention, a method for operational monitoring of a catalytic converter of an exhaust system for exhaust gases of an internal combustion engine, which comprises selecting at least two measurement locations at respective three-dimensionally spaced-apart cross-sectional regions of an exhaust system for exhaust gases of an internal combustion engine, defining at least a partial volume of a catalytic converter of the exhaust system between the measurement locations being definitive for catalytic conversion of pollutants in the exhaust gas; measuring and monitoring temperature at the at least two regions; and measuring the temperature at least at one of the measurement locations integrally over an approximately representative portion of at least one cross-sectional region rather than spotwise.

The invention is based on the concept that conversion of pollutants in the catalytic converter is an exothermic reaction, or in other words one in which energy is liberated. This energy causes the exhaust gas containing pollutants, which is located upstream of the catalytic converter (at least in a quasi-steady state), to have a lower temperature than the cleaned exhaust gas downstream of the catalytic converter. In the present invention, the intent is to exploit this effect to monitor the functional capacity of the catalytic converter and as much as possible to ascertain other information as well. To this end, the temperature is measured in two cross-sectional regions in the exhaust system, between which at least some of the catalytic converter volume that is definitive for the catalytic conversion is located. As will be described below in conjunction with the drawings, in order to attain significant measurement results it is not absolutely necessary for the entire catalytic converter volume to be located between the measurement locations. Various configurations of the measurement locations are therefore possible, which may depend heavily on the spatial conditions of a particular exhaust system. In the simplest case, the temperature may be measured in the exhaust line upstream and downstream of the catalytic converter, as mentioned above. Since in general the temperature distribution over the total flow cross section is not homogeneous in an exhaust system, and in particular not inside a catalytic converter body, it is useful to measure the temperature at certain measurement locations, not spotwise but rather integrally over an approximately representative portion of the cross-sectional region. This increases the accuracy of monitoring. A measurement is considered representative if it includes information both from the peripheral regions of the flow and from the central regions. For instance, a cross-sectional region may be a disk located in a cross-sectional plane of the exhaust system in which the measurement is carried out.

In accordance with another mode of the invention, there is provided a method which comprises measuring the temperature at least at one of the measurement locations with planar or approximately linear temperature sensors. Such temperature sensors are suitable for integral measurements and numerous types thereof are known in the prior art. Measurement sensors with a temperature-dependent resistor, preferably in the form of a wire, are especially appropriate. Temperature measurements furthermore are among the most accurate and best-controlled measurements in the technology, and are therefore suitable for the present application. They also react to relatively small, fast changes.

In accordance with a further mode of the invention, there is provided a method which comprises selecting at least one of the temperature measurement locations to be inside the catalytic converter. Particularly in heatable catalytic converters, electric ducts and leads are already available, so that this additional instrumentation does not excessively increase the expenditure for cable connections of the exhaust system.

In accordance with an added mode of the invention, there is provided a method which comprises selecting a first temperature measurement location at an upstream region inside the catalytic converter, and selecting a second temperature measurement location at a downstream region inside the catalytic converter. It can be assumed that a temperature measuring location integrated into the catalytic converter in the upstream end region measures the temperature proportional to the temperature of the oncoming exhaust gas, while a temperature measuring location in the downstream region of the catalytic converter measures a temperature proportional to the temperature of the outflowing exhaust gases. In this kind of configuration, various configurations in terms of system technology and theory may be made. On one hand, the temperature sensors may be disposed in such a way that they are essentially surrounded by the flow of exhaust gas and therefore measure the exhaust gas temperature, or the temperature measuring locations may be disposed in such a way that they are substantially in good thermal contact with the catalyst material or carrier material of the catalyst. There are good reasons for both options, and these reasons would have to be taken into account in selecting the measuring system, considering the primary operating temperatures and geometry of the catalytic converter configurations. For instance, it may be advantageous to measure the gas temperature in the upstream region of the catalytic converter and to measure the temperature of the carrier material in the downstream region. In terms of what is currently known about heat transport events, the energy liberated in the catalytic conversion is transmitted first to the carrier material of the catalyst and from it back to the outflowing exhaust gas.

In any case, the energy generated in the catalytic converter is so high that significant temperature differences are easily measured. In accordance with an additional mode of the invention, there is provided a method which comprises selecting the at least two measurement locations with at least 50% and preferably more than 70% of the catalytically active catalytic converter volume between the at least two measurement locations. It is therefore adequate if not all of the active catalytic converter volume is located between the measurement locations.

In accordance with yet another mode of the invention, there is provided a method which comprises performing the monitoring step with an electronic monitoring apparatus forming at least one temperature difference between measured values at the at least two measurement locations and detecting a function of the catalytic converter and/or of a control of the engine and/or optionally of a catalytic converter regulating system (if any) from the algebraic sign and/or an absolute magnitude and/or a behavior over time of the temperature difference. This also increases the accuracy of the measurement. If the temperature difference is formed as $\Delta T = T1 - T2$, where T1 is the measured value at an upstream measurement location and T2 is the measured value at a downstream measurement location, the following statements can be obtained qualitatively:

a) if $\Delta T$ is very small or even positive, then no conversion is taking place in the catalytic converter, and a "catalytic converter defective" report should be made;

b) if $\Delta T$ is negative and within a predetermined tolerance range, then all of the systems are operating properly, and no report is made;

c) if $\Delta T$ is negative and quite high, then evidently overly large proportions of pollutant or uncombusted fuel residues are reaching the exhaust system, causing a strong reaction in the catalytic converter. In that case, an "engine control defective" report should be made.

As will be described in further detail in conjunction with the exemplary embodiments, the proposed measuring system is extraordinarily sensitive to the appearance of uncombusted fuel residues in the exhaust gas. Through the use of the system, errors in the control of the engine can therefore also be diagnosed with high sensitivity, including in particular infrequent periodic or episodic misfiring in fuel-injected engines.

In accordance with yet a further mode of the invention, there is provided a method which comprises selecting an internal combustion engine, particularly an Otto engine for motor vehicles, as the engine, supplying data, particularly relating to a parameter selected from the group consisting of engine rpm, engine load, flow rates, and ambient conditions, to an electrically regulated engine control for the internal combustion engine, and at least partially functionally linking the data with the temperature difference in the electronic monitoring apparatus, such as through performance graphs, for enabling a precise functional diagnosis of the system. This refines the method even further by providing data from which a prediction can be made, within certain limits, of the temperature difference $\Delta T$ to be expected if the system is functioning properly. In this way, the abovedescribed qualitative diagnosis can be refined with typical microprocessors to make a precise quantitative diagnosis.

In accordance with yet an added mode of the invention, there is provided a method which comprises additionally jointly evaluating values measured by at least one lambda sensor in the exhaust system with the electronic monitoring apparatus.

Finally, feedback from the electronic monitoring apparatus to the engine control is possible, in such a way that at certain operating states of the catalytic converter (such as before the operating temperature is reached or if a predetermined maximum temperature is exceeded), suitable control commands in the engine control are varied.

In accordance with yet an additional mode of the invention, there is provided a method which comprises recalibrating the temperature sensors with the electronic monitoring apparatus at defined operating states, such as after the engine has been stopped for a relatively long period of time. A change in the temperature sensors over time can be compensated for by such an occasional recalibration. Once the engine has been stopped for a long time, all of the temperature sensors will have to have assumed the same temperature, so that in this state recalibration can be performed, optionally with the inclusion of the otherwise-measured outdoor temperature. To do this requires neither maintenance work nor intervention from outside.

With the objects of the invention in view, there is also provided, in an exhaust system having a catalytic converter for exhaust gases of an internal combustion engine, an apparatus for operational monitoring of the catalytic converter, comprising at least two temperature sensors disposed one after the other in exhaust gas flow direction in at least two cross-sectional regions of the exhaust system, defining at least a partial volume of the catalytic converter between the two cross-sectional regions being definitive for catalytic conversion of pollutants in the exhaust gas, at least one of the temperature sensors being planar or approximately linear and integrally measuring temperature over an approximately representative portion of the cross-sectional region in which the at least one temperature sensor is disposed; an electronic monitoring apparatus connected to the at least two temperature sensors for evaluating measured temperature values; and a display apparatus connected to the electronic monitoring apparatus for displaying an evaluation outcome.

In accordance with another feature of the invention, there is provided an electronic control connected to the engine, and data lines connecting the electronic monitoring apparatus to the control, for supplying data to the electronic monitoring apparatus, such as relating to at least one parameter selected from the group consisting of rpm, load, flow rates and ambient conditions.

In accordance with a further feature of the invention, at least one of the temperature sensors is integrated into the catalytic converter, preferably into the vicinity of a downstream end of the catalytic converter.

In accordance with an added feature of the invention, at least two of the temperature sensors are integrated into the catalytic converter, preferable in which one of the temperature sensors is integrated into the vicinity of an upstream end of the catalytic converter, and at least one of the temperature sensors is integrated into the vicinity of a downstream end of the catalytic converter.

In accordance with an additional feature of the invention, at least one of the temperature sensors has a temperature-dependent resistor as a measuring pickup.

In accordance with yet another feature of the invention, there are provided means for electrically heating the catalytic converter at least in subregions, and preferably the heating means are connected to the monitoring apparatus for regulating the heating with the monitoring apparatus while taking temperature measurement values into account.

In accordance with yet a further feature of the invention, there are provided data lines connecting the monitoring apparatus to the control, for supplying data from the monitoring apparatus to the control.

It is also important to point out that the present monitoring system is especially suitable in connection with electrically heatable catalytic converters. In electrically heatable catalytic converters, it is desirable to measure the actual temperature currently reached at a given time, in order to regulate the heating and optionally initiate starting of the engine once the starting temperature is attained. All or some of the temperature sensors provided for the operational monitoring can be jointly used for this purpose, making additional expenditure unnecessary. Since electrically heatable catalytic converters already have electric leads, it is also advantageous to provide the leads for instrumentation there, so that besides the cable system for a lambda sensor that may optionally be present, only one additional cable leads to the exhaust system.

With the objects of the invention in view, there is additionally provided a catalytic converter, comprising at least partially structured sheet-metal layers being stacked or wound together or intertwined or looped and defining end surfaces and cross-sectional regions, and at least one temperature sensor integrated into one of the structured sheet-metal layers in at least one of the cross-sectional regions near at least one of the end surfaces, for integrally measuring temperature over an approximately representative portion of the one cross-sectional region.

Such a catalytic converter is especially suitable for the apparatuses described above and for carrying out the monitoring method. In addition, however, and independently of that application it is also suitable for other systems in which such measured temperature values are needed.

In accordance with another feature of the invention, there are provided means for electrically heating the catalytic converter at least in subregions, the at least one temperature sensor being disposed in the vicinity of the subregions. In particular, heatable catalytic converters may be so equipped even if they are not provided with an operational monitor.

In accordance with a further feature of the invention, the at least one temperature sensor is disposed in a slit extending approximately transversely to the structure of the one sheet-metal layer.

In accordance with an added feature of the invention, the cross-sectional regions have a peripheral region and a central region, and the at least one temperature sensor extends radially both beyond the peripheral region and beyond the central region of the one cross-sectional region.

In accordance with an additional feature of the invention, the at least two temperature sensors include a wire with an ohmic resistor dependent on temperature, a metal jacket surrounding the wire, and an insulating layer electrically insulating the metal jacket from the wire.

In accordance with a concomitant feature of the invention, the jacket is formed of a material selected from the group consisting of Inconel and a high-temperature-proof steel containing at least one material selected from the group consisting of chromium and aluminum.

Other features which are considered as characteristic for the invention are set forth in the appended claims.

Although the invention is illustrated and described herein as embodied in a method and an apparatus for operational monitoring of a catalytic converter of an internal combustion engine and a catalytic converter to be monitored, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
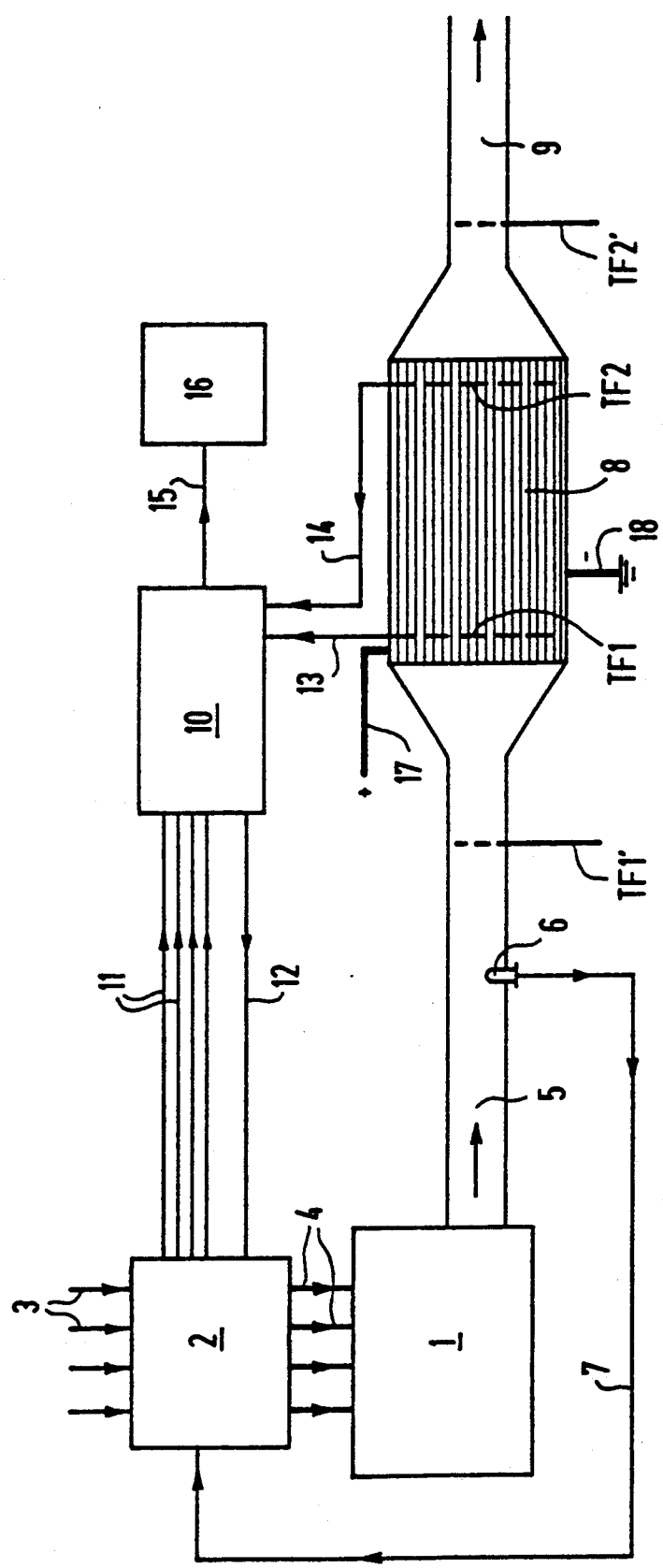
FIG. 1 is a fragmentary, diagrammatic and schematic overview of an engine and a catalytic converter monitoring system according to the invention.

Referring now to the figures of the drawing in detail and first, particularly, to FIG. 1 thereof, there is seen an internal combustion engine with an electronic engine control 2 that receives information from outside through measurement value feed or supply lines 3 and accordingly controls the engine 1 through engine feed or supply lines 4. Exhaust gases pass in a direction indicated by an arrow from the engine into an exhaust gas line 5, in which a lambda sensor 6 is disposed. The lambda sensor 6 in turn is connected to the engine control 2 through a measured value line 7. A catalytic converter 8 is disposed in the exhaust gas line 5 and is followed by an exhaust outlet line 9. The catalytic converter 8 may include one or more individual disks, and naturally the exhaust system can also be constructed as a dual or otherwise multiple system, but neither of these factors plays a decisive role for the present invention. The catalytic converter 8 may also be electrically heatable, at least in subregions, and may have corresponding electrical leads 17 and 18.

According to the invention, at least two temperature sensors are to be disposed in the exhaust system, with at least some of the catalytically active volume located between them. In the case of temperature sensors disposed upstream, FIG. 1 shows two alternatives, namely a temperature sensor TF1 in an upstream end region of the catalytic converter 8 and a temperature sensor TF1, in the exhaust line 5. In the case of downstream temperature sensors, two alternatives are also shown, namely a temperature sensor TF2 integrated into a downstream end region of the catalytic converter 8 and a temperature sensor TF2' disposed in the exhaust outlet line 9. The choice as to which of the various alternatives should advantageously be combined with on another depends on the given geometric situation and other factors. It is important above all that a substantial portion of the catalytic reactions proceed between the measurement locations. The measured temperature values are supplied to an electronic monitoring apparatus 10 through measurement lines 13 and 14. This apparatus 10 evaluates the measured values, and optionally data fed from the engine control 2 through data feed or supply lines 11 may also be utilized in the evaluation. A feedback from the electronic monitoring apparatus to the engine control 2 through data output lines 12 is also possible. The outcome of the monitoring is passed on through a diagnosis line 15 to a diagnosis outcome display 16. This display may be constructed in the form of signal lights or indicator-type instruments.

Figure 2:
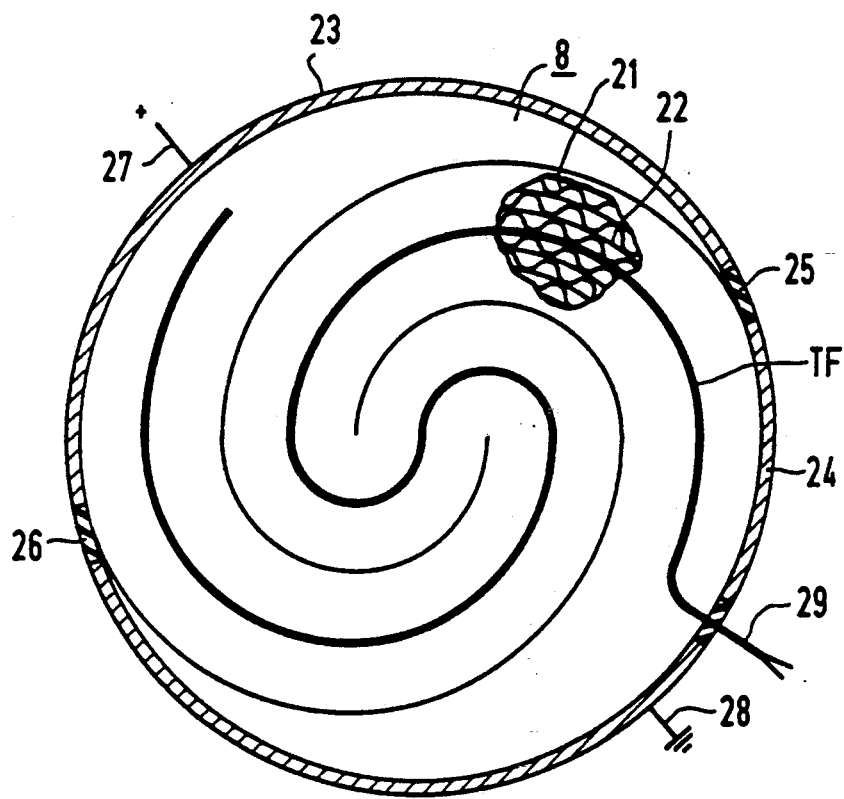
FIG. 2 is a cross-sectional view of an exemplary embodiment of a catalytic converter constructed according to the invention, at a level of a temperature sensor.

FIG. 2 shows one possible exemplary embodiment of the invention for a case in which temperature sensors are integrated with a catalytic converter 8. FIG. 2 is a fragmentary, diagrammatically illustrated section through the catalytic converter 8, at the level of the temperature sensor TF. FIG. 2 involves an embodiment of an electrically heatable metal catalyst carrier known from Published International Application WO 89/10470, which includes contrarily looped layers of sheet metal and which is subdivided in its cross-sectional area by insulating layers, in such a way that an electrical resistance and a current path that are suitable for heating are created. This catalytic converter 8 is assembled from alternating layers of corrugated metal sheets 21 and smooth metal sheets 22 and is provided in its interior with spiral insulating layers running inwardly, which are only schematically shown in the drawing. The sheet-metal layers are surrounded by a jacket which includes two half-shells 23, 24 that are electrically separated from one another by insulating segments 25, 26. The jacket half-shells 23, 24 are provided with electrical leads 27, 28 for electric heating.

Figure 3:
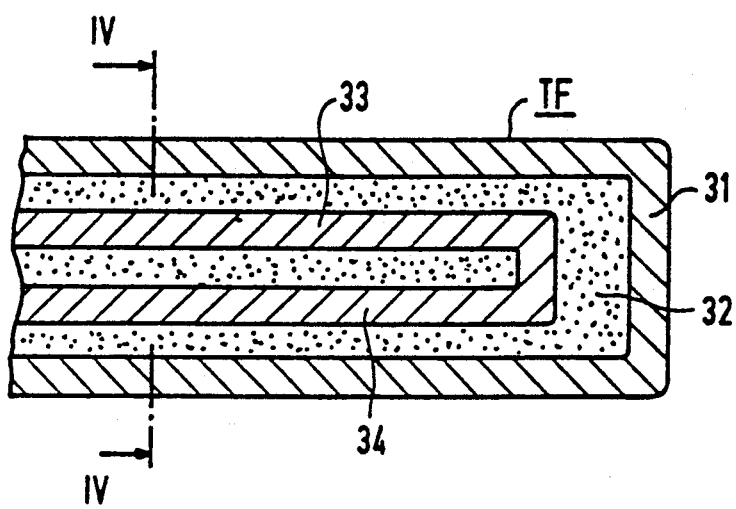
FIG. 3 is a fragmentary, longitudinal-section view
Figure 4:
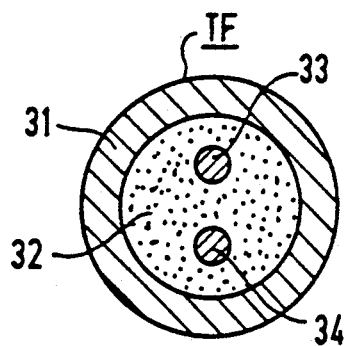
FIG. 4 is a cross-sectional view taken along the line IV—IV of FIG. 3 in the direction of the arrows, showing the structure of a suitable temperature sensor.

The temperature sensor TF, which includes a wire having a resistance that varies with temperature in the present exemplary embodiment, extends in the interior of this catalytic converter 8, parallel to the individual sheet-metal layers. In order to eliminate the need to provide two leads for the temperature sensors at different locations, the resistor wire is installed in the shape of a U in the interior. In other words, the resistor wire includes a forward line and a return line that are joined together at the end, as is shown in FIGS. 3 and 4. The temperature sensor TF is extended to the outside through the jacket half-shell 24 on one end and has leads 29 at that location for the measurement lines. The principle of the way in which a temperature sensor TF is installed in a catalytic converter 8 that is illustrated herein, is only one exemplary embodiment. Many other options for catalytic converters with a different structure are conceivable, in particular those which include winding a temperature sensor spirally or incorporating it in a transverse bore.

For purposes of illustration, FIG. 3 shows a longitudinal section through the end of the temperature sensor TF, and FIG. 4 shows a cross section taken along the line IV-IV of FIG. 3. The temperature sensor has a jacket 31 which may, for instance, be formed of "INCONEL" or some other high-temperature-proof steel with chromium and/or aluminum components. Depending on existing requirements, the jacket 31 may also be formed of the same material as the metal sheets of the catalytic converter 8, which permits a problem-free soldering together of the temperature sensor TF and the metal sheets 21, 22 or the jacket 24. A wire 33, 34 is installed in a U in the interior of the temperature sensor TF. For instance, the wire may be formed of nickel or another material that has a resistance that is strongly dependent on temperature. In a known manner, an insulating layer 32, for instance of magnesium oxide powder, prevents contact of the two lines 33, 34 of the resistor wire both with one another and with the jacket 31.

Figure 5:
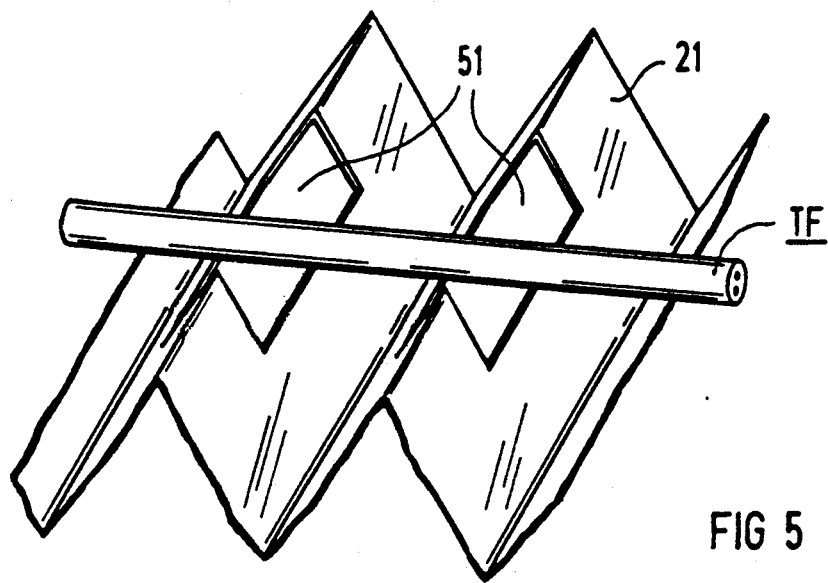
FIG. 5 is a fragmentary, perspective view of an example of a way in which a temperature sensor is technically fastened to a catalytic converter body.

FIG. 5 illustrates a small portion of a corrugated, or in the present case a folded, metal sheet of the kind used to assemble catalyst carrier bodies. A receptacle for a temperature sensor TF can be created by grinding a suitable groove 51 in the crests of the corrugations transversely to the course of the structure. This makes it possible to layer or wind or loop the temperature sensor together with the structured metal sheet 21 to form a catalyst carrier body. The groove 51 should not be substantially larger than the cross section of the temperature sensor, as is shown herein for illustration purposes, but should instead have about the same dimensions, so that the temperature sensor TF can be soldered in or at least fixed by means of the groove. If the groove 51 is made so deep that the temperature sensor TF is located at approximately half the height of the corrugation, then it will primarily measure the temperature of the gas flowing past, rather than measuring the temperature of the structure itself to the same extent. In contrast, if the depth of the groove 51 is less and if soldering to the next adjacent smooth metal sheet is performed, it is possible to have the temperature sensor TF measure primarily the temperature of the carrier structure. It is therefore possible to provide a flexible construction to meet given requirements.

The present invention is especially suitable for advanced integral diagnostic and monitoring systems in motor vehicles, which have internal combustion engines with electronic injection and are equipped with regulated catalytic converters. The invention is especially advantageously usable in connection with electrically heatable catalytic converters.

We claim:

1. A method for operational monitoring of a catalytic converter of an exhaust system for exhaust gases of an internal combustion engine, which comprises:
   selecting at least two measurement locations at respective three-dimensionally spaced-apart cross-sectional regions of an exhaust system for exhaust gases of an internal combustion engine, defining at least a partial volume of the catalytic converter of the exhaust system between the measurement locations being definitive for catalytic conversion of pollutants in the exhaust gas;
   measuring and monitoring temperature at the at least two regions; and
   measuring the temperature at least at one of the measurement locations integrally over an approximately representative portion of at least one cross-sectional region and not spotwise.

2. The method according to claim 1, which comprises measuring the temperature at least at one of the measurement locations with planar temperature sensors.

3. The method according to claim 1, which comprises measuring the temperature at least at one of the measurement locations with approximately linear temperature sensors.

4. The method according to claim I, which comprises selecting at least one of the temperature measurement locations to be inside the catalytic converter.

5. The method according to claim 1, which comprises selecting a first temperature measurement location at an upstream region inside the catalytic converter, and selecting a second temperature measurement location at a downstream region inside the catalytic converter.

6. The method according to claim 1, which comprises selecting the at least two measurement locations with at least 50% of the catalytically active catalytic converter volume between the at least two measurement locations.

7. The method according to claim 1, which comprises selecting the at least two measurement locations with more than 70% of the catalytically active catalytic converter volume between the at least two measurement locations.

8. The method according to claim 1, which comprises performing the monitoring step with an electronic monitoring apparatus forming at least one temperature difference between measured values at the at least two measurement locations and detecting a function of at least one of the catalytic converter, a control of the engine and a catalytic converter regulating system from at least one of an algebraic sign, an absolute magnitude and a behavior over time of the temperature difference.

9. The method according to claim 8, which comprises selecting an internal combustion engine as the engine, supplying data to an electrically regulated engine control for the internal combustion engine, and at least partially functionally linking the data with the temperature difference in the electronic monitoring apparatus for enabling a precise functional diagnosis of the engine and the exhaust system.

10. The method according to claim 9, which comprises selecting the internal combustion engine as an Otto engine for motor vehicles.

11. The method according to claim 9, which comprises relating the data to a parameter selected from the group consisting of engine rpm, engine load, flow rates, and ambient conditions.

12. The method according to claim 9, which comprises performing the step of at least partially functionally linking the data with the temperature difference through performance graphs.

13. The method according to claim 9, which comprises additionally jointly evaluating values measured by at least one lambda sensor in the exhaust system with the electronic monitoring apparatus.

14. The method according to claim 8, which comprises recalibrating the temperature sensors with the electronic monitoring apparatus at defined operating states.

15. The method according to claim 14, which comprises performing the step of recalibrating the temperature sensors after the engine has been stopped for a relatively long period of time.

16. In an exhaust system having a catalytic converter for exhaust gases of an internal combustion engine, an apparatus for operational monitoring of the catalytic converter, comprising:
   a) at least two temperature sensors disposed one after the other in exhaust gas flow direction in at least two cross-sectional regions of the exhaust system, defining at least a partial volume of the catalytic converter between said two cross-sectional regions being definitive for catalytic conversion of pollutants in the exhaust gas, at least one of said temperature sensors integrally measuring temperature over an approximately representative portion of said crosssectional region in which said at least one temperature sensor is disposed;
   b) an electronic monitoring apparatus connected to said at least two temperature sensors for evaluating measured temperature values; and
   c) a display apparatus connected to said electronic monitoring apparatus for displaying an evaluation outcome.

17. The apparatus according to claim 16, wherein said at least one temperature sensor integrally measuring temperature is planar.

18. The apparatus according to claim 16, wherein said at least one temperature sensor integrally measuring temperature is approximately linear.

19. The apparatus according to claim 16, including an electronic control connected to the engine, and data lines connecting said electronic monitoring apparatus to the control, for supplying data to said electronic monitoring apparatus.

20. The apparatus according to claim 19, wherein said data relate to at least one parameter selected from the group consisting of rpm, load, flow rates and ambient conditions.

21. The apparatus according to claim 16, wherein at least one of said temperature sensors is integrated into the catalytic converter.

22. The apparatus according to claim 16, wherein at least one of said temperature sensors is integrated into the vicinity of a downstream end of the catalytic converter.

23. The apparatus according to claim 16, wherein at least two of said temperature sensors are integrated into the catalytic converter.

24. The apparatus according to claim 16, wherein at least one of said temperature sensors is integrated into the vicinity of an upstream end of the catalytic converter, and at least one of said temperature sensors is integrated into the vicinity of a downstream end of the catalytic converter.

25. The apparatus according to claim 16, wherein at least one of said temperature sensors has a temperature-dependent resistor as a measuring pickup.

26. The apparatus according to claim 16, including means for electrically heating the catalytic converter at least in subregions.

27. The apparatus according to claim 26, wherein said heating means are connected to said monitoring apparatus for regulating the heating with said monitoring apparatus while taking temperature measurement values into account.

28. The apparatus according to claim 19, including data lines connecting said monitoring apparatus to said control, for supplying data from said monitoring apparatus to said control.

29. A catalytic converter, comprising at least partially structured sheet-metal layers defining end surfaces and cross-sectional regions, and at least one temperature sensor integrated into one of said structured sheet-metal layers in at least one of said cross-sectional regions near at least one of said end surfaces, for integrally measuring temperature over an approximately representative portion of said one cross-sectional region.

30. The catalytic converter according to claim 29, wherein said sheet-metal layers are stacked together.

31. The catalytic converter according to claim 29, wherein said sheet-metal layers are wound together.

32. The catalytic converter according to claim 29, wherein said sheet-metal layers are intertwined.

33. The catalytic converter according to claim 29, including means for electrically heating the catalytic converter at least in subregions, said at least one temperature sensor being disposed in the vicinity of said subregions.

34. The catalytic converter according to claim 29, wherein said at least one temperature sensor is disposed in a slit extending approximately transversely to the structure of said one sheet-metal layer.

35. The catalytic converter according to claim 29, wherein said cross-sectional regions have a peripheral region and a central region, and said at least one temperature sensor extends radially both beyond said peripheral region and beyond said central region of said one cross-sectional region.

36. The catalytic converter according to claim 21, wherein said at least two temperature sensors include a wire with an ohmic resistor dependent on temperature, a metal jacket surrounding said wire, and an insulating layer electrically insulating said metal jacket from said wire.

37. The catalytic converter according to claim 29, wherein said at least one temperature sensor includes a wire with an ohmic resistor dependent on temperature, a metal jacket surrounding said wire, and an insulating layer electrically insulating said metal jacket from said wire.

38. The catalytic converter according to claim 36, wherein said jacket is formed of a material selected from the group consisting of Inconel and a high-temperature-proof steel containing at least one material selected from the group consisting of chromium and aluminum.

39. The catalytic converter according to claim 37, wherein said jacket is formed of a material selected from the group consisting of Inconel and a high-temperature-proof steel containing at least one material selected from the group consisting of chromium and aluminum.

* * * * *